(No Model.)

M. O. REHFUSS.
BOTTLE STOPPER.

No. 368,113.           Patented Aug. 9, 1887.

Witnesses:
William D. Conner.
Harry Drury

Inventor:
Martin O. Rehfuss
by his Attorneys
Howson & Sons

UNITED STATES PATENT OFFICE.

MARTIN OSCAR REHFUSS, OF PHILADELPHIA, PENNSYLVANIA, ASSIGNOR TO THE JOLY STOPPER COMPANY, OF SAME PLACE.

BOTTLE-STOPPER.

SPECIFICATION forming part of Letters Patent No. 368,113, dated August 9, 1887.

Application filed February 28, 1887. Serial No. 229,119. (No model.)

*To all whom it may concern:*

Be it known that I, MARTIN OSCAR REHFUSS, a citizen of the United States, and a resident of Philadelphia, Pennsylvania, have invented certain Improvements in Bottle-Stoppers, of which the following is a specification.

My invention consists of an improved form of neck-wire for carrying the retaining-bail in that class of bottle-stoppers in which the stopper is detachable from the bail, the novel feature of my invention being fully set forth and specifically claimed hereinafter.

Figure 1:
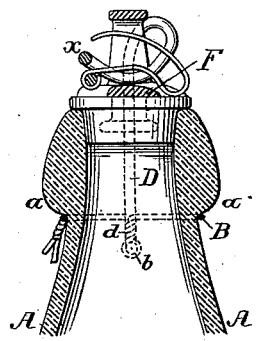
Figure 2:
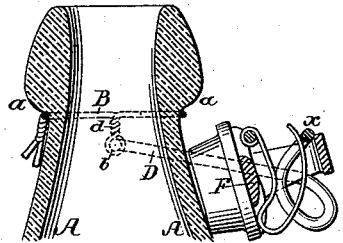
Figure 3:
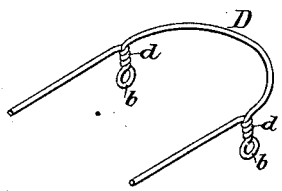

In the accompanying drawings, Figure 1 is a sectional view, partly in elevation, of the neck of a bottle with stopper and neck-wire in accordance with my invention. Fig. 2 is a view showing the parts adjusted for the removal of the stopper from the bail, and Fig. 3 a perspective view of the neck-wire before its application to the neck of the bottle.

A represents part of the neck of a bottle having the usual enlargement at the upper end, forming a shoulder, $a$, beneath which is the neck-wire B, having eyes $b$ for the reception of trunnions at the lower ends of the legs of the bail D, the top loop of which acts upon the stopper F and serves to retain the same in its seat on the mouth of the bottle.

The stopper shown in the present instance is similar to that forming the subject of Lloyd's patent, No. 345,910, July 20, 1886, although it should be understood that my invention is applicable to other stoppers of this class.

In many bottles the distance from the shoulder $a$ to the top of the bottle is so short that when the bail is hung to eyes formed directly upon the neck-wire, as in the patent referred to, said bail is so short that when it is thrown down, as shown in Fig. 2, in order to permit the stopper to be detached, the distance between the cross-bar X of the bail and the side of the bottle-neck is not sufficient to receive the stopper; hence much difficulty has been experienced in removing the stoppers from the short bails which it has been necessary to use in connection with this class of bottles.

In order that I may use a bail long enough to provide between the cross-bar of said bail and the side of the bottle-neck sufficient space to permit the removal of the stopper, I form the pivot-eyes $b$ for the bail at the lower ends of stems $d$, which project down from the neck-wire and are twisted to prevent the wires forming the stems from being pulled apart by the strain exerted upon the neck-wire in twisting the ends of the same together in order to fasten it to the neck. By this means the pivots of the bail are at such a distance from the mouth of the bottle as to provide the length of bail necessary to permit the removal of the stopper when the parts are adjusted to the position shown in Fig. 2.

I claim as my invention—

1. The combination of the pivoted retaining-bail, the stopper detachable from the same, and the neck-wire having downwardly-projecting stems carrying the pivot-eyes for the bail, all substantially as specified.

2. The combination of a bottle having a shoulder below the mouth, the pivoted retaining-bail, a stopper detachable from the bail, and the neck-wire engaging with the shoulder of the bottle and having downwardly-projecting stems carrying the pivot-eyes for the bail, all substantially as specified.

In testimony whereof I have signed my name to this specification in the presence of two subscribing witnesses.

MARTIN OSCAR REHFUSS.

Witnesses:
WILLIAM D. CONNER,
HARRY SMITH.